UNITED STATES PATENT OFFICE 2,475,932

7 - HYDROXYISOQUINOLINE DERIVATIVES AND METHODS OF PREPARING THE SAME

Robert B. Woodward, Cambridge, Mass., and William von Eggers Doering, New York, N. Y., assignors to Polaroid Corporation, Cambridge, Mass., a corporation of Delaware No Drawing. Application November 4, 1943, Serial No. 508,954

9 Claims. (Cl. 260—247)

This invention relates to the formation of compounds useful in the synthesis of quinine and cinchona alkaloids and more particularly to 7-hydroxyisoquinoline derivatives and to methods of preparing the same.

One object of the present invention is to provide novel 7-hydroxyisoquinoline derivatives having, or being transformable to compounds having the skeleton:

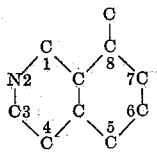

Another object is to provide a novel method of synthesizing the above compounds from 7-hydroxyisoquinoline.

A further object is to provide a novel method of forming 7-hydroxy-8-N-substituted-aminomethylisoquinolines, i. e., derivatives of 7-hydroxyisoquinoline having the group —CH$_2$—N< attached by a carbon-to-carbon bond at the eight position of the isoquinoline skeleton.

Still another object is to provide a novel method of transforming the above compounds into 7-hydroxy-8-methylisoquinoline.

One method of preparing the novel compositions of the present invention is to react 7-hydroxyisoquinoline with formaldehyde and a composition from the class consisting of primary and secondary amines, these ingredients being preferably mixed in a hydroxylic solvent, such as ethanol, methanol or water, or in a mixture of said solvents, as for example aqueous ethanol or aqueous methanol. The formaldehyde may be obtained from any suitable source and may be conveniently introduced into the reaction mixture in aqueous solution. The primary or secondary amine may, for example, be any one of the following: piperidine, morpholine, aniline and its homologues, and the alkyl and dialkyl amines, such as methylamine, ethylamine, dimethylamine, diethylamine, methylethylamine, propylamine, dipropylamine, methylpropylamine, ethylpropylamine, ethylbutylamine, isopropylbutylamine, as well as aryl substituted derivatives of said alkyl and of said dialkyl amines. The completely aromatic secondary amines, as for example diphenylamine and the aromatic heterocyclic amines, such as indole and thiazole, are less preferred than the non-aromatic heterocyclic secondary amines, such as morpholine and piperidine and the non-cyclic amines having at least one alkyl group attached to the nitrogen, such as the alkyl and dialkyl amines.

The product of the above reaction comprises a 7-hydroxyisoquinoline derivative having an N-substituted-aminomethyl group, i. e., —CH$_2$—N<, attached to the eight position of the isoquinoline ring, the specific amino substituent depending on the one of the primary and secondary amines which is used as a reaction ingredient. The product, for example, of a reaction mixture including aniline, is 7-hydroxy-8-anilinomethylisoquinoline; of a mixture including methylaniline, is 7-hydroxy-8-methylanilinomethylisoquinoline; of a mixture including methylamine, is 7-hydroxy-8-methylaminomethylisoquinoline; of a mixture including dimethylamine is 7-hydroxy-8-dimethylaminomethylisoquinoline; of a mixture including piperidine is 7-hydroxy-8-piperidinomethylisoquinoline; and of a mixture including morpholine is 7-hydroxy-8-morpholinomethylisoquinoline. The 7-hydroxy-8-N-substituted-aminomethylisoquinolines may be separated from the reaction product and purified in any conventional manner.

A novel method of purifying 7-hydroxy-8-piperidinomethylisoquinoline is to react said compound with an excess of sodium hydroxide to form the sodium salt thereof, said salt being substantially insoluble in the sodium hydroxide solution formed by the excess of sodium hydroxide. The salt can be readily crystallized and the 7-hydroxy-8-piperidinomethylisoquinoline regenerated therefrom by acidification.

To prepare 7-hydroxy-8-methylisoquinoline, any one of the 7-hydroxy-8-N-substituted-aminomethylisoquinolines is reduced by being reacted with an alkali methoxide, such as sodium methoxide or potassium methoxide, preferably in a hydroxylic solvent, such as methanol. This reaction is preferably carried out in an autoclave and a preferred temperature and time range therefor is between 200 and 250° C. and from six to sixteen hours. The reaction products comprise the alkali salt, e. g., the sodium or potassium salt, of 7-hydroxy-8-methylisoquinoline and said salt is neutralized by acidification to free the 7-hydroxy-8-methylisoquinoline, the latter compound being thereafter isolated from the reaction products, preferably by sublimation and crystallization.

One method of purifying the 7-hydroxy-8-methylisoquinoline is by forming the oxalate of said compound, crystallizing said oxalate, and then acidifying the same to regenerate the pure 7-hydroxy-8-methylisoquinoline.

An alternate, and for commercial production, a preferred method of obtaining the novel 7-hydroxy-8-methylisoquinoline is to react the products of the initial reaction, i. e., the reaction products of formaldehyde, 7-hydroxyisoquinoline and the primary or secondary amine directly with the alkali methoxide, without first isolating the 7-hydroxy-8-N - substituted - aminomethylisoquinoline. The 7-hydroxy-8-methylisoquinoline is thereafter obtained, isolated and purified, as above described.

The following examples are given to illustrate the invention but it will be understood that the invention is not limited thereto except as indicated by the appended claims. Example 1 illustrates the preparation and isolation of the 8-N-substituted-aminomethyl derivative of 7-hydroxyisoquinoline, 7-hydroxy-8-piperidinomethylisoquinoline. Example 2 illustrates the preparation of 7-hydroxy-8-methylisoquinoline from the 7-hydroxy-8-piperidinomethylisoquinoline of Example 1. Example 3 is illustrative of the synthesis of 7-hydroxy-8-methylisoquinoline from 7-hydroxyisoquinoline wherein the 8-N-substituted-aminomethyl derivative is not isolated prior to reduction.

*Example 1*

A solution of 6 grams of 7-hydroxyisoquinoline in 30 cc. of methanol is treated first with 3.53 grams of piperidine and then with 3.7 grams of 35% formaldehyde. After standing for four hours, the solvent is removed and the oil is dissolved in 30 cc. of 2 N sodium hydroxide. On cooling in ice the sodium salt of the 7-hydroxy-8-piperidinomethylisoquinoline is obtained. It is filtered and from it the desired material is regenerated by neutralizing with acid and extracting with ether. The oil left on evaporation of the ether is dissolved in boiling hexane. The clear solution deposits brilliant prisms of 7-hydroxy-8-piperidinomethylisoquinoline, having a melting point of from 81.5 to 82.5° C.

*Example 2*

Twelve grams of sodium metal is dissolved in 100 cc. of absolute methyl alcohol. Ten grams of 7-hydroxy-8-piperidinomethylisoquinoline in 50 cc. of absolute methyl alcohol is added and the solution is heated for sixteen hours at 220° C. in the autoclave.

Water and hydrochloric acid are added to the reaction solution and the methanol is boiled off. On buffering with sodium carbonate solution, 5.1 grams of crude product is obtained.

Sublimation of the crude 7-hydroxy-8-methylisoquinoline gives 4.24 grams of pure material having a melting point of from 229 to 231° C.

*Example 3*

Twenty grams of 7-hydroxyisoquinoline is dissolved in 500 cc. of boiling methanol containing 12 grams of piperidine. To the cooled solution is added 14 grams of 35% formalin solution. After standing for 2½ hours at room temperature, the solvent is blown off and the residual oil is dried in vacuo. The dried oil is taken up in 550 cc. of absolute methanol and 130 grams of sodium methoxide is added. The solution is heated in the autoclave at 220° C. for twelve hours.

The reaction mixture is diluted with 400 cc. of water and partially neutralized with 150 cc. of concentrated hydrochloric acid. The solution is boiled down to 400 cc. at which time 300 cc. additional water is added and boiling is continued till the vapors no longer burn. The cooled solution is neutralized with hydrochloric acid and buffered with sodium bicarbonate. The precipitate of 7-hydroxy-8-methylisoquinoline is collected and dried.

The crude material is sublimed and the sublimate is dissolved in 400 cc. of methanol. After concentrating the solution to 200 cc. and cooling, 10.3 grams of shiny platelets, having a melting point of from 230 to 232° C., is obtained.

Since certain changes in carrying out the above methods and in obtaining the various species of the invention may be made without departing from the scope thereof, it is intended that all matter contained in the above description shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. The method of forming a 7-hydroxy-8-N-substituted-aminomethylisoquinoline which comprises reacting 7-hydroxyisoquinoline, formaldehyde and a compound from the class consisting of primary and secondary amines.

2. The method of forming a 7-hydroxy-8-N-substituted-aminomethylisoquinoline which comprises reacting in an aqueous alcoholic solvent 7-hydroxyisoquinoline, an aqueous solution of formaldehyde and a compound from the class consisting of primary and secondary amines.

3. As a new composition, a 7-hydroxy-8-N-substituted-aminomethylisoquinoline.

4. As a new composition, 7-hydroxy-8-N-piperidinomethylisoquinoline.

5. As a new composition, a 7-hydroxy-8-dialkylaminomethylisoquinoline.

6. As a new composition, 7-hydroxy-8-dimethylaminomethylisoquinoline.

7. As a new composition, 7-hydroxy-8-morpholinomethylisoquinoline.

8. The method of isolating and purifying 7-hydroxy-8-piperidinomethylisoquinoline from a mixture containing said compound which comprises reacting said mixture with an excess of sodium hydroxide to form the sodium salt of the 7-hydroxy - 8 - piperidinomethylisoquinoline, crystallizing said salt to separate the same from the mixture, and acidifying the salt to regenerate the 7-hydroxy-8-piperidinomethylisoquinoline.

9. The method of purifying 7-hydroxy-8-piperidinomethylisoquinoline which comprises forming the sodium salt of said compound in a sodium hydroxide solution, crystallizing said salt and acidifying the salt to regenerate the pure 7-hydroxy-8-piperidinomethylisoquinoline.

ROBERT B. WOODWARD.
WILLIAM von EGGERS DOERING.

REFERENCES CITED

The following references are of record in the file of this patent:

Gazzeta Chimica italiana, vol. 62, pp. 878–886.
Berichte der deutschen chemischen Gesellschaft, vol. 19, p. 1036.

Certificate of Correction

July 12, 1949

Patent No. 2,475,932

ROBERT B. WOODWARD ET AL.

It is hereby certified that error appears in the printed specification of the above numbered patent requiring correction as follows:

Column 4, line 40, for "7-hydroxy-8-N-piper-" read *7-hydroxy-8-piper-*; and that the said Letters Patent should be read with this correction therein that the same may conform to the record of the case in the Patent Office.

Signed and sealed this 23rd day of May, A. D. 1950.

[SEAL]

THOMAS F. MURPHY,
*Assistant Commissioner of Patents.*